March 11, 1969          H. O. ANGER          3,432,660
GAMMA-RAY CAMERA FOR IMAGING RADIOISOTOPE DISTRIBUTION IN A
TRANSVERSE SECTION OF A ROTATING SUBJECT
Filed April 10, 1968          Sheet 1 of 2

INVENTOR.
HAL O. ANGER
BY

ATTORNEY.

3,432,660
GAMMA-RAY CAMERA FOR IMAGING RADIOISO-
TOPE DISTRIBUTION IN A TRANSVERSE SEC-
TION OF A ROTATING SUBJECT
Hal O. Anger, Berkeley, Calif., assignor to the United
States of America as represented by the United States
Atomic Energy Commission
Filed Apr. 10, 1968, Ser. No. 720,174
U.S. Cl. 250—71.5                                    6 Claims
Int. Cl. G01t 1/20; H01j 39/18; G01n 21/00

ABSTRACT OF THE DISCLOSURE

A radiation detector for showing the distribution of a radioactive substance in a transverse section through a subject uses a radiation camera with an oscillographic readout means. The subject is rotated while viewed by the radiation camera which is focused in the plane of the section and unfocused in the transverse plane. An image of scintillations detected in the camera is formed on an oscilloscope and projected through a cylindrical lens onto a photographic film rotated in synchronism with the subject.

Background of the invention

This invention relates generally to radioisotope detectors and more particularly to a scanner for obtaining an image of radioisotope distribution in a section through a subject. The invention described herein was made in the course of, or under, Contract W-7405-eng-48 with the Atomic Energy Commission.

The present invention falls into a general class of radioactivity detector used for locating concentrations of radioactive material in in vivo tissue or for tracing the flow or movement of such material through the body. As generally utilized, a radioactive isotope is introduced into a patient either orally or by injection. If, for instance, the isotope is one that tends to concentrate in tumors, then the position of a tumor may be determined by locating regions in the body of the patient where the radioactivity is most intense. Analysis of information obtained by such means is greatly facilitated by producing an image in which the size, shape and position of a tumor or tumors are indicated.

A preferred type of radiation image detector, which may be adapted for use with the present invention, is described in U.S. Patent No. 3,011,057 issued Nov. 28, 1961, for Radiation Image Device, to the present inventor. However, other image detectors, as described in the Transactions of the Instrument Society of America, vol. 5, pp. 311–334, October 1966, may also be suitable for use with the invention.

In general, such detectors provide an intensified image of scintillations occurring in a radiation sensitive crystal. Such image is usually reproduced on the screen of an oscilloscope, as a momentary spot of light at a point spatially corresponding to the position from which radiation emanates from a subject. Each unit of detected radiation is individually displayed, one at a time, as a dot on the oscilloscope screen, a composite of many such dots recorded photographically forming an image of the radioisotope distribution in the subject.

Summary of the invention

With the conventional image detector, the image obtained is transverse to the axis of the radiation image detector, that is, transverse to the direction the detector is pointing. In contrast, the present invention provides an image of a section through the subject, the axis of the detector defining the section scanned while the subject is turned slowly with respect to the detector. Such image of a section or slice through a patient is particularly useful for examination of relatively thick parts of the body such as the brain or the liver. Thus, the present invention may be advantageous over conventional image detectors in that the position of radioisotopes deep within the body is more readily determinable.

Radioactive emanations from the radioisotopes, such as gamma rays, are passed through a collimator which is focused in the plane of the section being observed, and unfocused in the transverse plane. The resulting oscilloscopic image at a single setting of the detector cannot show the depth of radioisotopes into the section being scanned. However, by rotating the subject or patient while at the same time projecting the oscillographic image onto a photographic film which is rotated in synchronism with the patient, an image of radioactive material distribution is obtained.

Brief description of the drawings

The invention will be better understood with reference to the following description taken together with the drawings of which.

Description of the preferred embodiments

Figure 2:
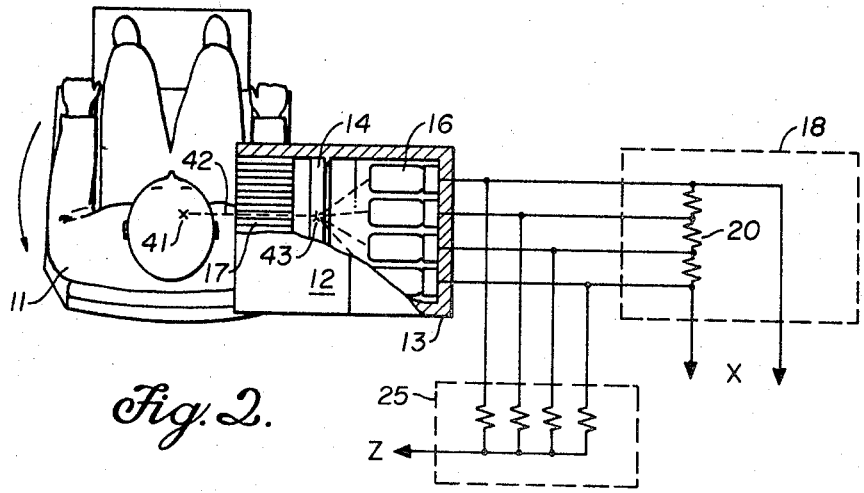
FIGURE 2 is a plan view of the scanner as disposed in relationship with a subject or patient.
Figure 1:
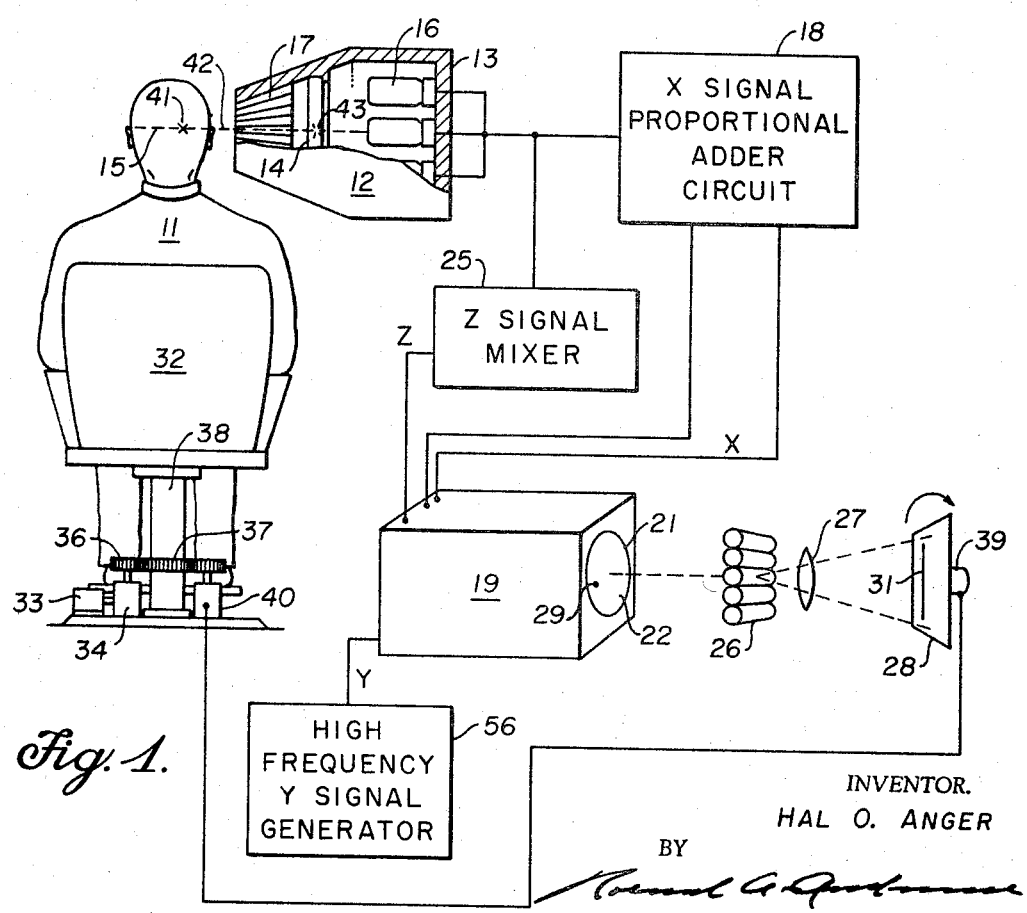
FIGURE 1 is a general view of the scanner as used for viewing the brain of a patient, the readout portion of the scanner being shown in perspective to better show the arrangement of the optical components.

Referring now to FIGURES 1 and 2, there is indicated a human subject 11 for whom an image is to be obtained of radioactivity emanating from a section 15 through the head. Prior to the time the scanner is employed, the subject will have engested a small quantity of some radioactive tracer substance. A radioactivity position sensing detector 12 is provided of the class responsive to the position at which radioactive emanations are detected.

In a preferred type of scintillation camera detector, an outer casing 13 for shielding from both light and radioactivity is provided for a thick flat scintillation crystal 14 and for an array of photomultiplier tubes 16, which view the crystal. A multi-channel collimator 17 is provided at one end of the casing 13, the collimator being unfocused in one plane as shown in FIGURE 2 and focused in the transverse plane of the section 15, as shown in FIGURE 1. While the photomultiplier tubes 16 are equally spaced from the crystal 14, the phototube output signals have an amplitude related to the distance from a scintillation in the crystal 14 to each of the photomultiplier tubes. Thus the phototubes 16 nearest a scintillation have output pulse signals of higher amplitude than the more distant phototubes. As indicated in FIGURE 1, several parallel connected rows (three rows each with four phototubes in each row) of phototubes are used with the outputs of each file of three phototubes electrically tied together to increase the amplitude of the signals obtained and to better view the entire crystal.

The combined pulse output signals for each file of phototubes 16 are then coupled to an X signal proportional adder circuit 18 in which the signals are combined in a resistive voltage divider 20 to obtain an X position signal corresponding to the X rectangular coordinates of each scintillation in crystal 14. At the same time, a Z intensity control signal is derived in Z signal mixer circuit 25, which combines the outputs of all the phototubes 16. The resultant Z signal is a pulse of standard amplitude produced for each scintillation. As an alternate type of construction, the X and Z signals may be derived using capacitors, instead of resistors, as described in The IEEE Transactions on Nuclear Science, June 1966, vol. NS–13, No. 3, pages 381, 382 and 388.

An oscilloscope 19 has a cathode-ray-tube 21 to which the X and Z signals are applied. Normally, the electron beam in the cathode-ray-tube is blanked, there being no light created on the screen 22 of the cathode-ray-tube until a Z signal, which functions as an intensity control signal for the electron beam of the cathode-ray-tube, is received from the mixer circuit 25. Simultaneously with the arrival of a Z signal, the X coordinate position signal is also received at the cathode-ray-tube 21 and deflects the electron beam therein to a position on screen 22 corresponding to the location of the scintillation in crystal 14. The Z signal unblanks the tube and a flash of light occurs at such position on the screen 22 at a position corresponding to the location of the scintillation in crystal 14.

One or more parallel cylindrical rod type lenses 26 (Maddox lens) are disposed in front of the screen 22, such lens distorting or defocusing the image of each point of light produced on screen 22 into a line perpendicular to the X-axis of the oscilloscope. A conventional lens 27 then focuses the line image onto a photographic film 28. To better show the optical characteristics, the perspective of FIGURE 1 with respect to film 28 has distorted so that both screen 22 and the forward facing surface of film 28 may be seen. In use, the film 28 would be parallel to the screen 22.

For example, a spot of light 29 on screen 22 would be focused on film 28 as a line 31. However, the X distance coordinate is preserved in the image formed on film 28 in the spacing between lines.

In the operation of the invention, the subject 11 is seated in a rotable chair 32, the center plane of camera 12 including the section 15 the edge of which is indicated by a dashed line in FIGURE 1 through the head of the subject 11. A drive motor 33, operating through a speed reducing gear box 34, is coupled through a drive gear 36 which engages a gear 37 on a support shaft 38 for the chair 32. The lower end of shaft 38 is on bearings so that shaft 38 can be rotated to turn the chair 32. A angular position repeating motor (selsyn) is rotated with rotation of the chair 32, the film 28 being rotated in one-to-one synchronism with the chair by position repeater motors 39 and 40.

In operation, a gamma-ray from, for instance, a radioactive isotope at a position 41 in section 15, passes into the collimator 17 and enters crystal 14 if the trajectory 42 of the gamma-ray is aligned with one of the passageways in the collimator. At point 43 in crystal 14, the gamma-ray decays, causing a very rapid flash of light, which is detected by the phototubes 16. The phototubes 16 each produce an output pulse having an amplitude related to the distance from the scintillation. An X and Z signal are derived in circuits 18 and 25, and a spot 29 of light is formed on the oscilloscope screen 22. The resulting line image 31 is recorded in the emulsion of film 28.

The subject 11 is slowly rotated by the motor 33, while film 28 is rotated in synchronism. Each time a gamma-ray from the radioisotopes in subject 11 passes through the collimator 17, additional line images are recorded on film 28.

Figure 3:
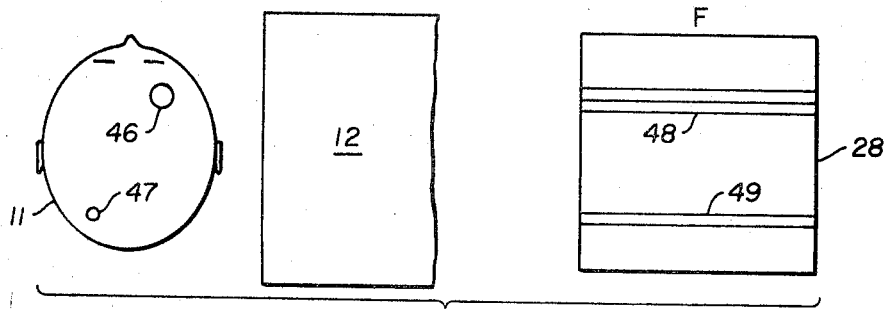
FIGURES 3 to 5 show how an image is progressively formed as the subject is rotated.
Figure 4:
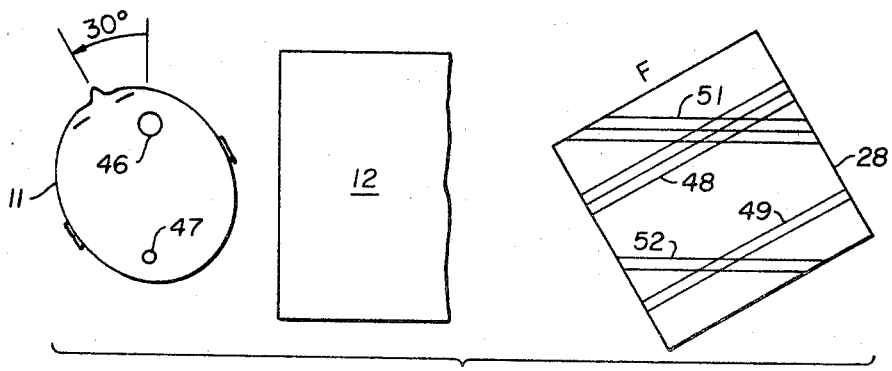
Figure 5:
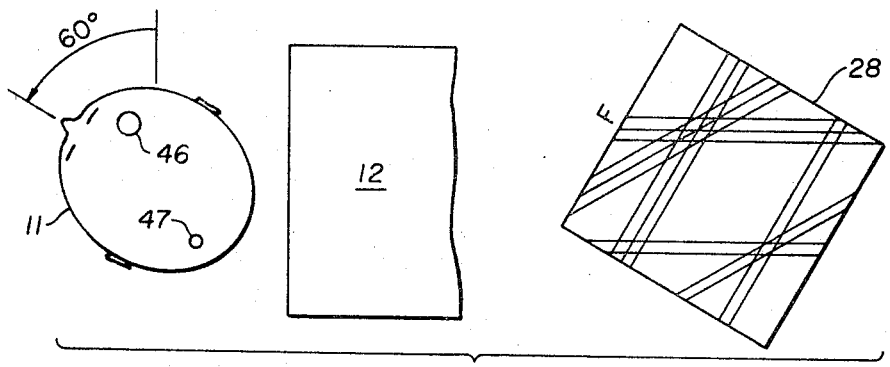

Considering FIGURES 3 to 5, the manner in which an image is progressively formed on the film 28 is shown. A top view of the subject 11 is shown with two regions 46 and 47 in plane 15 being indicated in which radioactive isotopes have concentrated. A portion of the camera 12 is indicated to show the position thereof with respect to the subject's head while the film 28 is shown with the line images thereon as progressively formed while the subject is turned. As an aid in following the turning of the film, one edge of the film 28, corresponding to the front of the subject, is indicated by an "F." In FIGURE 3, radiation from the larger region 46 is recorded on film 28 as lines 48 while radiation from the smaller region 47 is recorded as lines 49.

In FIGURE 4, both the subject and the film have been rotated 30 degrees, further radiation from regions 46 and 47 being recorded as groups of lines 51 and 52 respectively. The further recording of lines is indicated in FIGURE 5 taken at 60 degrees. It is readily apparent that the line images on film 28 will cross at positions corresponding to the positions of regions 46 and 47. When film 28 is developed, the location of such regions 46 and 47 is indicated by a higher density while the remainder of the film has been subjected to a lower degree of exposure.

As an alternate means for defocusing spots on the screen 22 into lines, a high frequency generator 56 may be connected to the Y-axis terminals of oscilloscope so that any spot of light formed on screen 22 is lengthened perpendicularly to the X-axis. Such generator can be used together with the cylindrical lens 26 to achieve defocusing of light spots. If the frequency of the signal generator is very high, it may be possible to omit the lens 26. In any case, the Y-axis defocusing of the image on the screen 22 may avoid possible damage to the screen if the peak light intensity level is set very high.

An intensified image of scintillations in crystal 14 might be provided by image intensifiers or by utilizing spark chambers, replacing the phototubes 16, adder circuit 18, mixer circuit 25, and oscilloscope 19. Also, instead of rotating the subject, the camera could be rotated around a stationary subject with equal results.

Therefore, while a particular embodiment of the invention has been described, it is obvious that many variations are possible within the spirit and scope of the invention and it is not intended to limit the invention except as defined in the following claims.

What is claimed is:
1. A radiation detector for obtaining an image of radioactive material concentrations along a first plane in a subject, the combination comprising:
   (a) a radiation sensitive scintillation crystal disposed across and intersecting said first plane,
   (b) a collimator disposed between said subject and said crystal, and collimator being focused in said first plane and unfocused in a perpendicular plane,
   (c) means displaying an intensified image of scintillations in said crystal, said image being displayed along a first axis corresponding to an intersection between said crystal and said plane,
   (d) means defocusing images in said means displaying along a second axis perpendicular to said first axis,
   (e) a photographic film exposed to said intensified image,
   (f) means rotating said subject with respect to said crystal about an axis perpendicular to said plane, and
   (g) means rotating said photographic film in synchronism with said means rotating said subject.

2. A radiation detector as described in claim 1, further characterized in that said means displaying an intensified image has a plurality of phototubes viewing said crystal, a proportional type adder circuit receiving output signals from said phototubes, an oscilloscope having an electron beam deflectable along a first deflection axis according to output signals from said adder circuit, a mixer circuit receiving output signals from said phototubes, said oscilloscope having a beam intensity control connected to the output of said mixer circuit.

3. A radiation detector as described in claim 2 wherein said means focusing has a high frequency generator with an output coupled to said oscilloscope, said electron beam in said oscilloscope being deflectable along said second axis according to output signals from said high frequency generator.

4. A radiation detector as described in claim 1 wherein said means focusing is at least one cylindrical lens disposed between said means displaying and said photographic film, the axis of said cylindrical lens being parallel to said first axis.

5. A radiation detector as described in claim 1 wherein said means rotating said subject has a rotatable support for said subject, said support holding said subject immediately adjacent said collimator.

6. A radiation detector as described in claim 5 wherein said means rotating said photographic film is a pair of synchro type motors one having a rotatable shaft to which said film is coupled and the other having a shaft coupled to said rotatable support.

References Cited

UNITED STATES PATENTS

| | | | |
|---|---|---|---|
| 3,011,057 | 11/1961 | Anger | 250—71.5 |
| 3,320,418 | 5/1967 | Steel. | |
| 3,329,814 | 7/1967 | Anger. | |

RALPH G. NILSON, *Primary Examiner.*

MORTON J. FROME, *Assistant Examiner.*

U.S. Cl. X.R.

250—53, 61.5, 65